United States Patent [19]

Arvidsson

[11] 4,007,706
[45] Feb. 15, 1977

[54] APPARATUS FOR TREATING WORK PIECES

[76] Inventor: Karl Ewald Arvidsson, Dannemoragatan 10, 113 44 Stockholm, Sweden

[22] Filed: May 6, 1975

[21] Appl. No.: 574,962

[30] Foreign Application Priority Data

May 6, 1974 Sweden ............................ 74-06006

[52] U.S. Cl. .............................. 118/50; 118/421; 21/65; 427/294
[51] Int. Cl.² ........................................ B27K 3/10
[58] Field of Search .............. 118/49, 50, 421, 427; 427/294, 296, 297; 21/65

[56] References Cited

UNITED STATES PATENTS

| | | |
|---|---|---|
| 690,746 | 1/1902 | Lundeberg ........................ 118/50 |
| 2,704,992 | 3/1955 | Schell .............................. 118/49 |
| 3,128,206 | 4/1964 | Dungler .......................... 118/50 |
| 3,467,546 | 9/1969 | Page et al. .................. 118/50 X |
| 3,675,622 | 7/1962 | Griffin ............................ 118/421 |

*Primary Examiner*—Mervin Stein
*Attorney, Agent, or Firm*—Burns, Doane, Swecker & Mathis

[57] ABSTRACT

An apparatus for treating work pieces in a closed space having a collapsible material. The treatment utilizes a period of subpressure and a period of pressure, in which cavities in the pieces are more or less filled with liquid. Prior to this the cavities are wholly or partially filled with a surface-tension reducing gas and/or solution.

13 Claims, 9 Drawing Figures

APPARATUS FOR TREATING WORK PIECES

FIELD OF THE INVENTION

The present invention relates to an apparatus for treating a workpiece in a closed space in which the workpiece is allowed to rest on a supporting surface intended therefor, and a method of temporarily or permanently filling the cavities, preferably with the aid of the apparatus defined above, of a material having a bulk density which is lower than the material density, said material being subjected to a period of subatmospheric pressure or vacuum during which air and/or liquid enclosed in said cavities is removed to a greater or a lesser extent.

Although the invention can be applied within a number of different fields, it will be described hereinafter with reference to the impregnation of wood.

DESCRIPTION OF PRIOR ART

It is known to impregnate wood by placing the wood in an autoclave and to subject the wood to a subatmospheric pressure or vacuum treatment process with subsequent pressure treatment, to cause impregnating liquid to be forced into the pores of the wood under pressure. In such processes it is a prime requirement that the impregnating liquid is able to enter pores which are located deeply within the wood, and a number of different methods have been proposed to this end. For example, it has been proposed that the pressure to which the liquid and the gas used are subjected is varied rapidly, in order to provide a good impregnating effect, a good stabilising effect and the desired colour effects. Different methods have also been proposed for producing new materials, for example by utilising the aforementioned known methods in conjunction with plastics material instead of an impregnating liquid.

OBJECTS OF THE PRESENT INVENTION

An object of the present invention is to utilise an apparatus in which the workpiece is allowed to rest on a supporting surface intended therefor. For the purpose of enabling a limited amount of impregnating liquid to be used and for the purpose of obtaining an apparatus which comprises light elements, the present invention proposes that for the treatment of said workpiece there is formed a closed space or chamber which comprises or which is defined by a collapsible material. The collapsible chamber or material is intended to conform to the outlines of the workpiece during the subatmospheric pressure treatment process, or during a treatment process in which pressure is supplied to the closed space from outside.

The present invention also relates to a method of temporarily or permanently filling cavities in a material whose bulk density is lower than its material density, preferably with the aid of an apparatus of the type described above. As will be recognized, when the bulk density of a material is lower than the density of said material, the material will contain pores or cavities. Examples of such material include wood, gas-concrete, concrete, etc. The present invention is based on the previously known step of subjecting the material to be treated to a period of subatmospheric pressure during which air and/or liquid enclosed in the cavities is removed therefrom to a greater or a lesser extent, so that the cavities are able to receive an impregnating liquid or some other liquid which it is desired to supply to said cavities in accordance with the present method. The basic feature of the method according to the invention resides in the fact that during the pressure treatment process which follows the period of subatmospheric pressure treatment, the cavities are filled more or less with liquid. The pressure period is commenced immediately when the pressure reaches or exceeds atmospheric. In accordance with the invention the cavities are first filled totally or partially with a surface-tension reducing gas and/or solution, whereafter said gas and/or solution is or are removed totally or partially from said cavities.

BRIEF DESCRIPTION OF THE DRAWINGS

So that the invention will be more readily understood and further features thereof made apparent, an embodiment thereof will now be described with reference to the accompanying drawings, in which.

DESCRIPTION OF A PREFERRED EMBODIMENT

Figure 4:
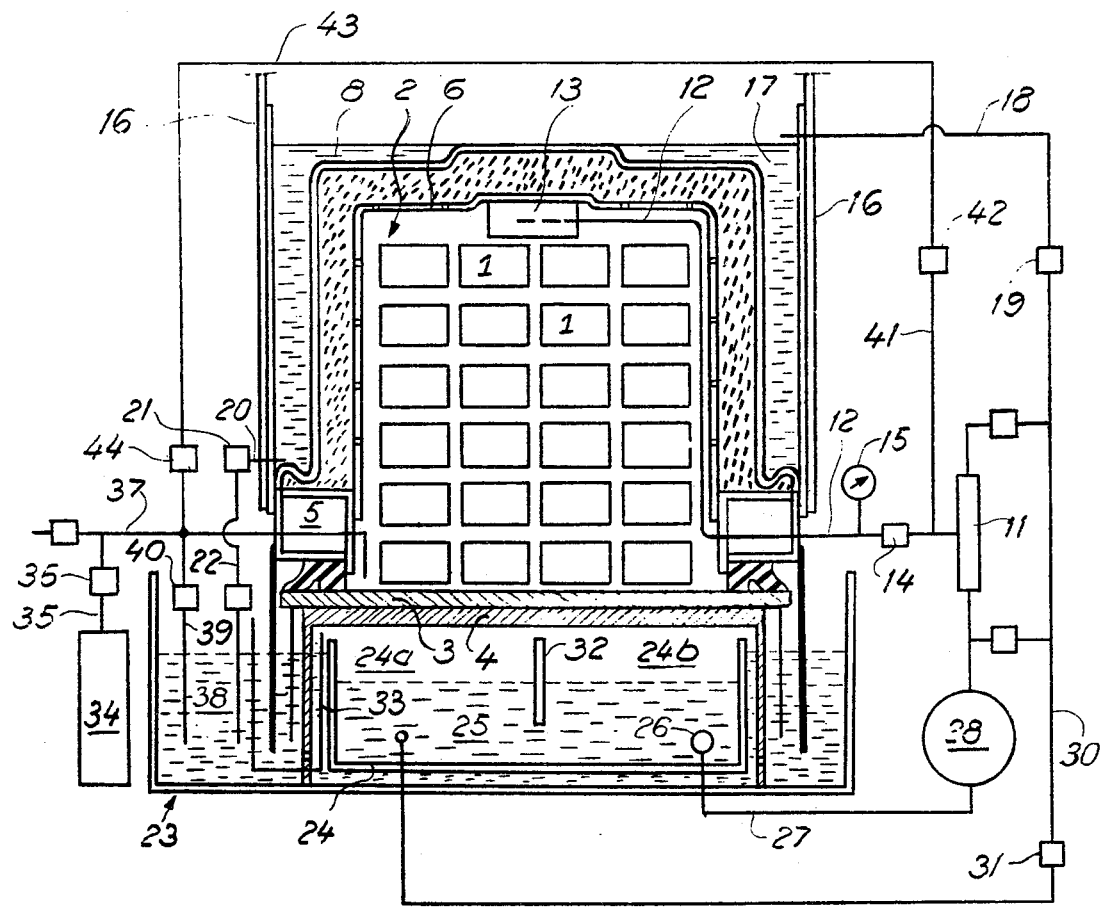
FIG. 4 shows a diagrammatic vertical sectional view of the apparatus shown in FIGS. 1, 2 and 3 showing the pipes and elements required for treating or impregnating a workpiece.
Figure 5:
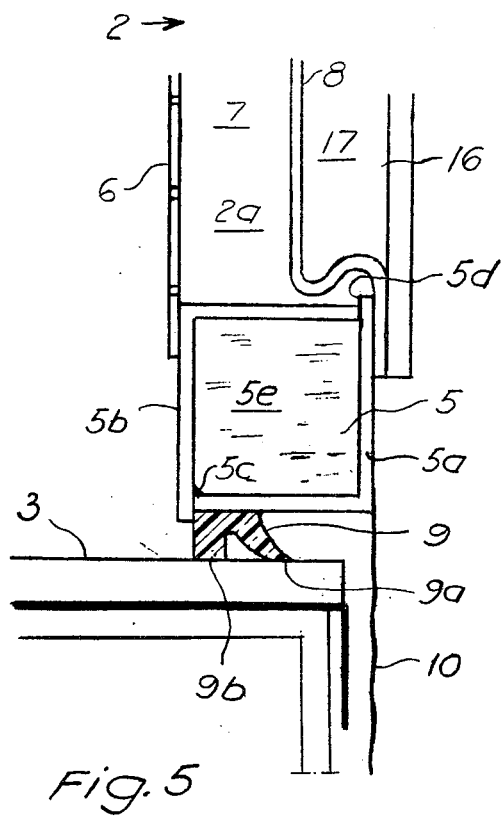
FIG. 5 shows, in enlarged scale, a sealing arrangement for use with the embodiment shown in FIG. 1, and FIGS. 6–9 show devices which enable the treatment process to be concentrated to certain, selected surfaces of said workpiece.

In the drawings there is shown an apparatus for treating one or more workpieces 1 in a closed space or chamber 2 having a workpiece-supporting surface 3 which in turn rests on a support surface 4. In FIG. 4, the surfaces 3 and 4 are shown displaced from each other. In accordance with the invention, the closed space 2 or chamber is defined by a collapsible material, the portions 2a of which facing the surface 3 co-act with a frame 5 which is arranged to cooperate with the surface 3 (see FIG. 5). The frame 5 comprises two angle-irons 5a and 5b which are joined together as by welds 5c, 5d to form an inner space 5e. The closed space is defined by a collapsible material in the form of an inner cloth 6, an intermediate layer of, for example, foam plastic 7, and an outer cloth 8.

The portion of the frame 5 facing the surface 3 co-acts with a seal 9 which is attached to the frame portion 5a and which has lip portions 9a and 9b facing said surface 3, thereby to provide a good seal between the closed space and the ambient air. This seal is particularly sensitive when the workpiece is subjected to a subatmospheric pressure treatment process.

With the illustrated embodiment, there is attached to the frame 5a skirt 10 which is arranged to extend into a container located beneath the surface 3. The purpose of the skirt 10 will be described hereinafter. There is nothing, however, to prevent the skirt 10 from being attached directly to the outer cloth 8 of the collapsible material 2.

An ejector device 11 is connected to the interior of the closed space or chamber 2 via a pipe 12 which is arranged to co-act with a suction device 13. As will be seen from FIG. 4, arranged between the ejector 11 and the suction device 13 is a valve 14 and an indicating instrument 15. The suction device 13 is arranged in the upper portion of the space 2 and is placed in a corresponding recess in the collapsible material.

The frame 5 supports a number of preferably evenly spaced posts 16 which support a wall extending around the collapsible space 2, said wall together with the posts 16 and the collapsible material forming a liquid-tight space 17. The space 17 can be filled with liquid by means of a pipe 18 and a valve 19, thereby to ensure the required pressure on the seal 9 between the frame 5 and the surface 3. The introduction of liquid into the space 17 also affords the advantage whereby the air located within the closed space 2 and the material is forced out through the evacuation pipe 12. The contents of the space 17 can be discharged to a tank 23 located beneath the surface 3 by means of a pipe 20, a valve 21 and a pipe 22.

In a container 24 there is stored a liquid 25 which is supplied to an ejector 11 via a screen 26, a pipe 27 and a pump 28. The used liquid is returned to the tank 24 via a pipe 30 and a valve 31 to remove air from a space 24a which is separated from space 24b by a wall 32. The air formed in space 24a is removed through a pipe 33.

Gas is stored in a container 34 and is passed to workpiece 1 via pipe 35, valve 36, and pipe 37. The pipe 37 extends through frame 5 and discharges within closed space 2. Treatment liquid 38 can be supplied to the material via pipe 39, valve 40, pipe 43, valve 42, pipe 41, valve 14 and pipe 12. Treatment liquid 25 can be supplied to the space 2 defined by the collapsible material via pipe 27, pump 28, pipe 41, valve 42, pipe 43, valve 44 and pipe 37.

Figure 2:
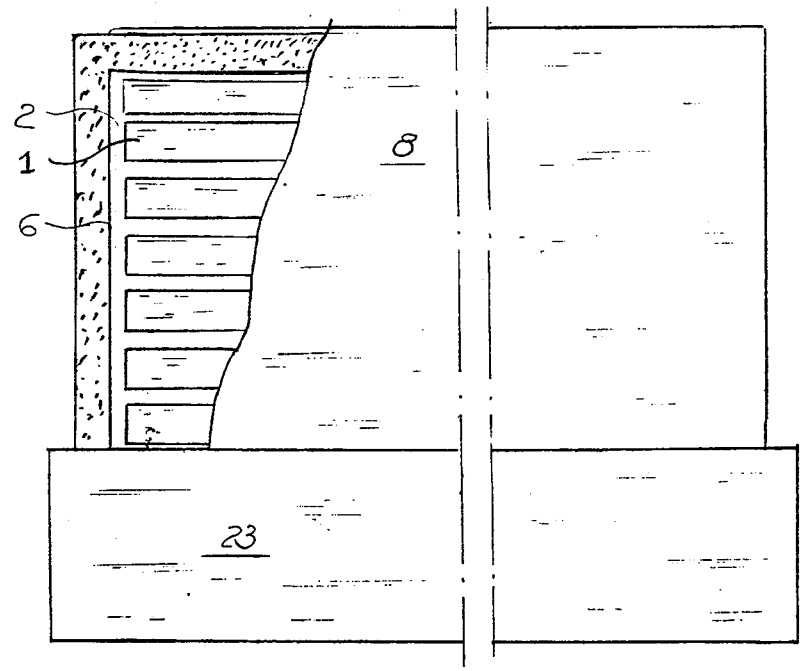
FIG. 2 shows a side view of the apparatus shown in FIG. 1.
Figure 1:
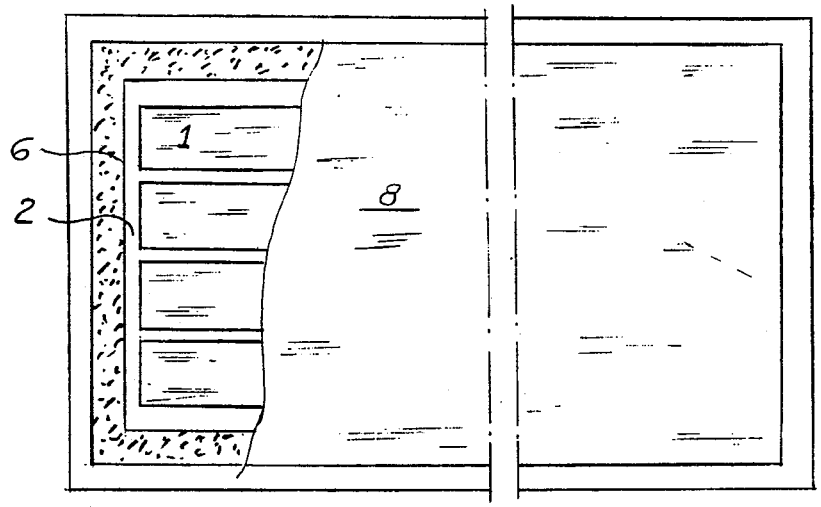
FIG. 1 shows a cut-away, shortened horizontal view of an apparatus according to the invention.
Figure 3:
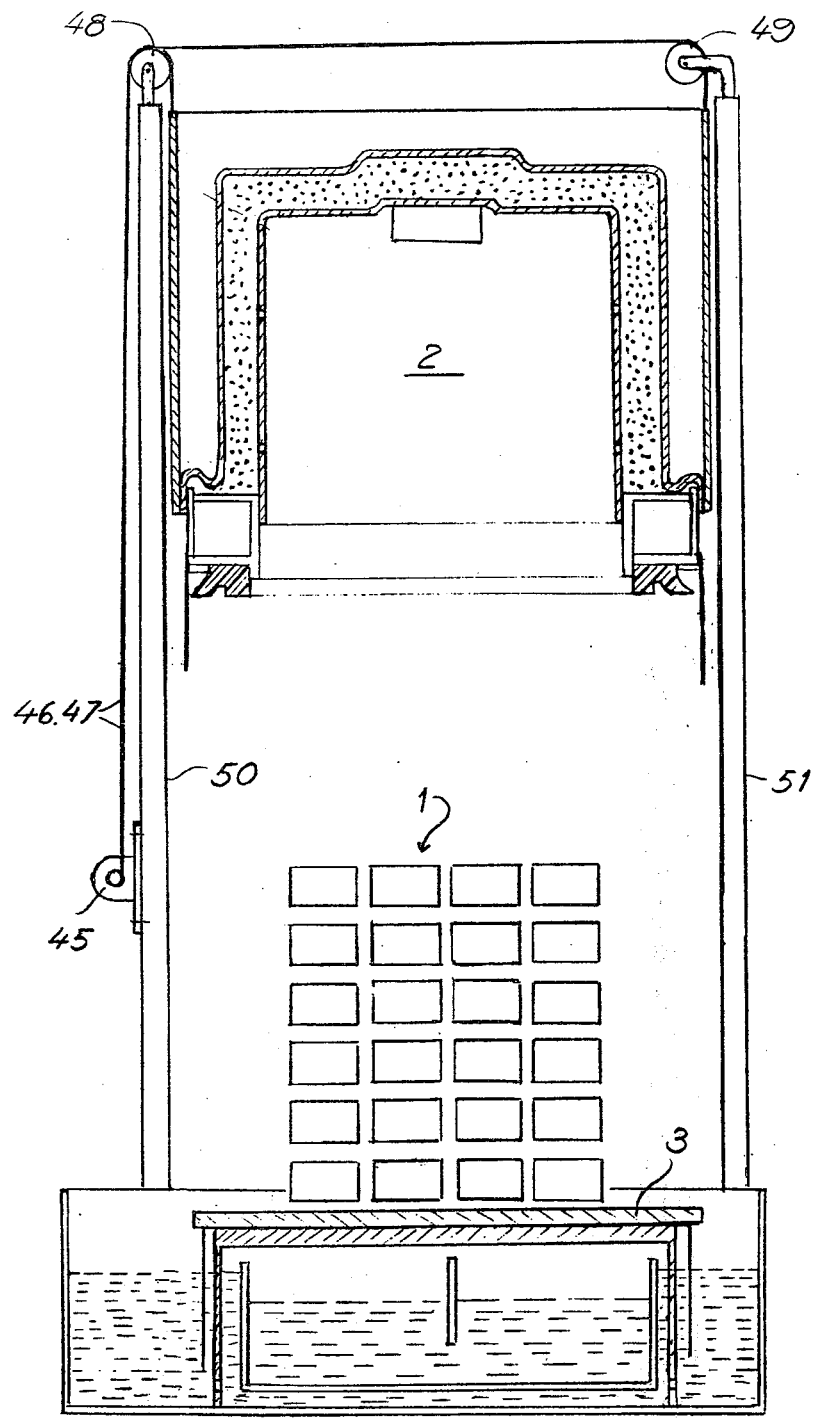
FIG. 3 shows a front view of the apparatus shown in FIGS. 1 and 2 showing diagrammatically a lifting device for the closed space, the closed space being shown partly in cross section.

As shown in FIG. 3, the closed space or chamber 2 may be raised and lowered by means of a lifting device 45 comprising ropes 46 and 47 and pulleys 48 and 49. The ropes 46 and 47 may, to advantage, co-act with the posts 16. The lifting device 45 may be caused to move along guides 50 and 51. The lifting device is presumed to comprise known components and is not restrictive of the invention and is hence only schematically disclosed.

Figure 9:
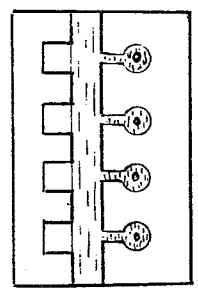
Figure 8:
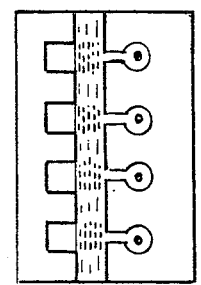
Figure 7:
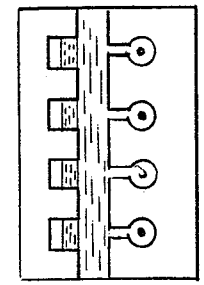
Figure 6:
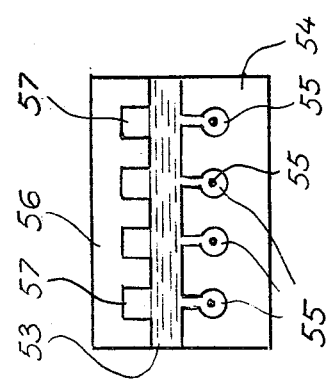

The invention also enables the workpiece to be subjected to a concentrated and/or partial treatment process. This is illustrated in FIGS. 6–9. For this purpose there is used a porous plate 53 of plastic material which is placed on a workpiece 54 having cells or pores 55. The circles shown in the figures together with the dots 55 illustrate that the cavities are filled with air. On the material 53 there is placed a sheet 56 of irregular shape. During the period of subatmospheric pressure or vacuum treatment the air contained in the cavities 55 is evacuated via the sheet 53 and the recesses 57 in the plate 56, whereupon medium absorbed by the plate 53 under the effect of atmospheric pressure floats up and temporarily fills the recesses 57. When the pressure returns to normal, the medium returns to the plate 53 from which said medium is drawn into the cavities 55 under the effect of a pressure below atmospheric, thereby to fill said cavities, as shown in FIG. 9. FIG. 7 shows that the medium in the plate 53 fills the recess 57 with liquid and that this liquid during the pressure stage shown in FIG. 8 passes through the plate 53 from the space 57 into the pores 55. This latter is illustrated in FIG. 9. It will be readily perceived that the apparatus can be provided with several workpiece-supporting surfaces and several closed spaces and that these may be used in conjunction with one another, depending upon the complexity of the process.

The invention also relates to a method of temporarily or permanently filling cavities in a material whose bulk density is lower than its material density, with the aid of the above described apparatus. The material is subjected to a subatmospheric pressure or vacuum so as to remove air and/or liquid in the cavities to a greater or a lesser extent. During the subsequent pressure treatment process, the cavities are filled to a greater or lesser extent with liquid, there being obtained during said pressure period an increase in pressure up to or above atmospheric. By utilising a gas and/or liquid as a surface tension reducing agent and by permitting said agent to partially or completely fill the cavities and thereafter to remove, either completely or partially, said agent from said cavities there is obtained the advantage whereby a minimum of liquid or impregnating liquid is used, without departing from the requirement of coating the whole cell wall of the material with liquid. Subsequent to first filling the cavities with the gas and/or the solution, it is possible to subject the material to a subatmospheric pressure to a degree such that the gas and/or the solution boils from the cavities. In this way it is ensured that the cavities are not filled with liquid but that only the cell walls are coated with liquid. In certain instances it may be expedient to free the material from gas and/or solution when said material is surrounded by impregnating liquid. By increasing and decreasing the pressure rapidly, there is obtained a pumping action which further improves the possibilities of coating only the cell walls with impregnating liquid.

The cavities may be filled with a readily volatilized hydrocarbon, such a propylene, the pressure is reduced and the material then lowered into a less volatile hydrocarbon, such as paraffin (kerosene), tar or the like, whereupon the lighter hydrocarbon dissolves the heavier hydrocarbon. The stage in the process in which the heavier hydrocarbon is taken up is interrupted by increasing the subatmospheric pressure so that certain portions of the portion of the heavier hydrocarbon which has penetrated the cells is forced out again. By causing the cells to be filled once more, or a number of times, completely or partially with readily volatilised hydrocarbon, the cell walls become moistened with heavy hydrocarbons without the cells being filled in their entirety.

Although the above description has been made with reference to wood, other porous materials, such as concrete, may also be treated. When the material is to be treated with a plastic material, it is expedient to cause the hardener and plastic to be introduced alternatively into the cells. In this latter case considerable reaction heat is obtained, which is conveniently conducted away by means of a water-spray device.

The skirt 10 shown in FIG. 4 which extends into container 23 in which liquid 38 is stored is conveniently air-tight, thereby not to jeopardize the function of the apparatus. Since the evacuation means 11 is an essential part of the invention and since a considerable subatmospheric pressure is required, the liquid pump 11 is preferably operated with water or aqueous solution which can ensure a subatmospheric pressure within the range of a 95–99 % vacuum.

If it is assumed that this hydrocarbon is used first and is introduced into the cells, it is convenient to interrupt the stage in the process in which the heavy hydrocarbons, such as tar, are taken up, thereby to obtain a sealing effect. The saving thus obtained can be enhanced by re-increasing the subatmospheric pressure so that a portion of the tar which has penetrated the cells is again forced out and returned to the storage tank. The cells can then be filled once more, or a number of times, with propylene, i.e. the light hydrocarbon, which provides a further saving since the inner surfaces of the cells are then only moistened with the heavier hydrocarbon, such as tar, without the cells being entirely filled.

The feature illustrated in FIGS. 6–9 which enables the treatment process to be concentrated to certain portions of the workpiece can be applied when it is required to fill the cavities of one portion of said workpiece with more material than the cavities of other portions of the workpiece. An example of this is the requirement of filling the cavities of the tread surfaces of a stair construction with more plastic material than the riser surfaces of said construction. By creating a magazine, for example by permitting soft foam plastic to rest on the surface of the material, it is possible to penetrate certain portions of the material during the pressure period in certain quantities or excess quantities.

With the illustrated embodiment, the surface 3 is assumed to have the form of a plate having a cloth placed therearound, although it will be understood that this construction can be replaced with an air-tight box dimensioned for subatmospheric pressures. The apparatus can be operated with a liquid, such as a 2–4 % impregnating solution, or with two different liquids, such as a liquid solution comprising mainly water in the inner box 24 and, for example, oil, paraffin, plastic, tar solution or the like in the outer box 23, it being possible to provide the latter with a pigment for so-called colour impregnation.

With the described embodiment, the surface 3 has the form of a flat plate. However, there is nothing to prevent a recess being formed in said plate and to arrange for said recess to co-act with a closed space defined by a collapsible material, whereby the workpiece can be lowered into the plate 3, thereby enabling the height dimensions of the illustrated closed space 2 to be reduced. This embodiment can be used to advantage when, for example, boats or the like are to be impregnated in their entirety.

Further, in this way the workpiece may comprise fibre plates which are to be impregnated.

This can be effected by placing a bundle of fibre plates into the recess and supplying liquid thereto. Initially all of the plates will float in the liquid, but as soon as the lowermost plate has absorbed liquid, it will become heavy and will fall down onto the support surface 3, whereafter the remaining plates in turn also fall onto said surface.

The plates are then subjected to an evacuation step in which the liquid is removed from the plates, whereafter said plates are dried.

What I claim is:

1. Apparatus for treating workpieces in an enclosed space, said apparatus comprising:
   a. workpiece-supporting means having a workpiece-supporting surface;
   b. a rigid framework in proximity to and coextensive with edge portions of said workpiece-supporting surface, said framework having a side facing said workpiece-supporting surface;
   c. a collapsible material secured to said framework defining an enclosed space over the workpiece-supporting surface;
   d. a plurality of spaced posts secured to said framework; and
   e. wall members secured to and supported by said spaced posts extending continuously about said framework, said wall members together with said collapsible material defining between them a liquid-tight chamber.

2. Apparatus in accordance with claim 1 having flexible sealing means between the edge portions of the workpiece-supporting surface and the side of the framework facing said edge portions.

3. Apparatus in accordance with claim 1 further comprising a container disposed beneath said workpiece-supporting surface, said container extending beyond the sides of said workpiece-supporting surface, and a skirt member extending from the framework into said container.

4. Apparatus in accordance with claim 3 wherein the said skirt member is secured to the framework.

5. Apparatus in accordance with claim 3 wherein the skirt member is secured directly to the collapsible material as an extension therefrom.

6. Apparatus in accordance with claim 1 further comprising ejector means for evacuating the enclosed space and pipe means having one end connected to said ejector means and the end remote from said ejector means extending into said enclosed space.

7. Apparatus in accordance with claim 6 wherein the end of the pipe means remote from the ejector means extends into the upper portion of the enclosed space.

8. Apparatus in accordance with claim 2 further comprising means for admitting liquid to the liquid-tight chamber whereby to apply pressure to the flexible sealing means and to cause the enclosed space to be evacuated.

9. Apparatus in accordance with claim 1 in combination with a soft porous plate having a treating agent absorbed therein and a perforated plate cooperating with said porous plate for the concentrated treatment of selected portions of a workpiece on the workpiece-supporting surface.

10. Apparatus in accordance with claim 1 wherein the workpiece-supporting surface is provided with a recess disposed to coact with an enclosed space defined by the collapsible material.

11. Apparatus for treating workpieces in an enclosed space, said apparatus comprising:
   a. workpiece-supporting means having a workpiece-supporting surface;
   b. a rigid framework in proximity to and coextensive with edge portions of said workpiece-supporting surface;
   c. collapsible material secured to said framework defining an enclosed space over said workpiece-supporting surface;
   d. sealing means between said framework and said workpiece-supporting surface for sealing said enclosed space;
   e. a plurality of spaced posts secured to said framework;

f. wall members secured to and supported by said spaced posts extending continuously about said framework, said wall members together with said collapsible material defining between them a liquid-tight chamber surrounding said enclosed space;

g. suction means mounted on said collapsible material within the enclosed space;

h. external ejector means connected to said suction means for providing a subatmospheric pressure within said enclosed space;

i. pressurizing means and means connecting said pressurizing means to the enclosed space for providing a super-atmospheric pressure within said enclosed space;

j. liquid reservoir means;

k. liquid transfer means communicating with said liquid reservoir means and with said liquid-tight chamber and said enclosed space;

l. valve means connected to said liquid transfer means for selectively directing liquid from said reservoir means to said liquid-tight chamber or to said enclosed space; and m. means for returning liquid from said liquid-tight chamber and enclosed space to said reservoir means.

12. Apparatus in accordance with claim 11 wherein said liquid reservoir means comprises a pair of separate tanks for holding different treating liquids and said liquid transfer means comprises (a) separate pipe systems connecting each of said tanks with said liquid-tight chamber and said enclosed space, (b) pump means connected to said pipe systems for moving liquid from said tanks to said liquid-tight chamber and enclosed space, and (c) valve means connected in said pipe systems for selectively directing flow of liquids.

13. Apparatus in accordance with claim 12 wherein the workpiece-supporting means is provided with vertical supports, said workpiece-supporting means is secured by said vertical supports inside a first of the tanks, and the second of said tanks is mounted under said workpiece-supporting means inside said first tank.

* * * * *